2,768,168

PROCESS FOR THE PRODUCTION OF MELAMINE

Joseph Newton Robinson and Frederick John Leslie Miller, Trail, British Columbia, and Basil McDonnell, Rossland, British Columbia, Canada, assignors to The Consolidated Mining and Smelting Company of Canada Limited, Montreal, Quebec, Canada, a corporation of Canada No Drawing. Application June 2, 1952,
Serial No. 291,332

11 Claims. (Cl. 260—249.7)

This invention relates to a method of treating a mixture of urea, ammonia and sulphur dioxide to produce melamine.

This application is a division of our co-pending application Serial No. 227,932, filed May 23, 1951.

The method of producing melamine of the present invention comprises, in general, the steps of heating a mixture of urea, ammonia and sulphur dioxide at a temperature of at least 260° C. under a superatmospheric pressure of ammonia for a period of time at least sufficient to form melamine, and separating and recovering melamine from the reaction product.

The operation of the method appears to involve a series of complex reactions but may be represented by the following overall equation:

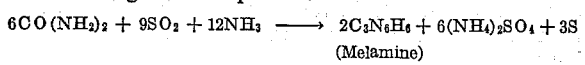
(Melamine)

in which the theoretical mol ratio of sulphur dioxide to urea is 9:6, or 1½:1.

The ammonia and sulphur dioxide may be liquid or gaseous, but practical considerations dictate that liquid reactants be employed in the method of the present invention. Care should be taken in the operation of the method to ensure that no water enters the reaction vessel, and the reactants should be anhydrous or as anhydrous as economically practicable for operation on a commercial scale, to prevent or restrict the formation of undesired by-products.

The method can be operated at temperatures within the range of from about 260° C. to about 360° C. and higher, depending upon the desired time of retention of the mixture in the reaction zone. At temperatures appreciably below 260° C., the reaction between the urea, ammonia and sulphur dioxide proceeds slowly and the time of retention required to obtain a satisfactory yield of melamine is too long for commercial operation.

At a temperature of about 260° C. and with a time of retention of the order of about two hours, only a small amount of melamine is formed; at a temperature of about 300° C. and a time of retention of about three hours, the yield of melamine is about 50% of the theoretical maximum yield and as the time of retention is extended to about eleven hours the yield of melamine increases to about 91% of the theoretical. At a temperature of about 360° C. and a time of retention of the order of thirty minutes, the yield of melamine is about 30%.

The method is operated under pressures of ammonia greater than atmospheric, the desired pressure being obtained by adding ammonia to the reaction vessel in excess of the stoichiometric amount required for reaction with the urea and sulphur dioxide. The reaction to form melamine is exothermic, at least in the initial stages, and the temperature must be controlled by removing heat. This temperature control can be readily effected within narrow limits by the evaporation of excess liquid ammonia fed into the reaction vessel during the course of the reaction. By controlling the reaction temperature in this manner, there is no need to provide the reaction vessel with heat transfer equipment, such as cooling coils, which would complicate the construction of the reaction vessel.

The pressure within the reaction vessel is also controlled by the use of excess ammonia, the ammonia vapour being released from the reaction vessel through a valve adjusted to maintain the required pressure. The released ammonia can be re-compressed and returned to the reaction vessel.

It is preferred to operate the process within the range of from about 200 to about 1000 pounds' pressure of ammonia per square inch. Pressures below about 200 pounds can be employed but result in reduced yields of the desired melamine product while pressures above 1000 pounds per square inch do not produce appreciably better yields and are not economic. Very satisfactory results as regards the yield of melamine and the costs involved in producing it are obtained by operating at a pressure of ammonia of the order of about 500 pounds per square inch.

As ammonia in excess of that required for reaction with urea and sulphur dioxide to produce melamine is added to the reaction vessel, the signifiant mol ratio is the ratio of sulphur dioxide to urea. The theoretical mol ratio of sulphur dioxide to urea is 1½:1 in the production of melamine. It is preferred, for the production of melamine, to use a mol ratio of sulphur dioxide to urea of at least about 1½:1. Satisfactory yields have been obtained with mol ratios up to about 4:1. Higher mol ratios are not necessary, and may result in reduced yields. Low mol ratios of sulphur dioxide to urea may result in reduced yields of melamine.

In the operation of the method, urea, liquid ammonia and liquid sulphur dioxide are charged into a pressure vessel, such as an autoclave. The ammonia is added in at least sufficient excess to produce the required pressure at the temperature to which the autoclave is to be heated. The temperature and pressure can be controlled as the reaction proceeds by evaporation of excess liquid ammonia fed to the autoclave. When the reaction has been completed, the autoclave is cooled and the reaction product is withdrawn and the melamine recovered.

The following examples illustrate the yields of melamine when operating the method under various conditions of temperature, mol ratios of sulphur dioxide to urea, pressure of ammonia and time of retention of the charge mixture in the reaction vessel. In each example, the yields are calculated as percentages of the maximum yields based on the carbon content of the urea charged into the reaction vessel.

| Temperature, °C. | Mol Ratio, SO₂: Urea | Ammonia Pressure, p. s. i. | Time | Melamine, Percent of Theoretical Maximum Yield |
|---|---|---|---|---|
| 220 | 2:1 | 500 | 2 hr | |
|  |  |  | 17 hr | |
|  |  |  | 24 hr | Tr. |
|  | 3:1 | 200 | 60 min | Tr. |
|  |  |  | 140 min | 3.4 |
| 260 | 4:1 | 200 | 60 min | 4.7 |
|  |  |  | 120 min | 4.3 |
|  | 6:1 | 200 | 60 min | |
|  |  |  | 120 min | |
| 280 | 3:1 | 1,000 | 30 min | |
|  |  |  | 60 min | 6.4 |
|  | 3:1 | 500 | 30 min | 1.7 |
|  |  |  | 120 min | 33.8 |
| 300 |  | 1,000 | 3 hr | 52.0 |
|  |  |  | 11 hr | 95.7 |
|  | 4:1 | 1,000 | 3 hr | 40.3 |
|  |  |  | 11 hr | 90.8 |
|  | 1:1 | 200 | 5 min | 5.0 |
|  |  |  | 30 min | 33.5 |
| 360 | 2:1 | 200 | 5 min | 11.0 |
|  |  |  | 10 min | 11.2 |
|  |  |  | 30 min | 28.2 |

The reaction product is essentially a mixture of melamine, ammonium sulphate, sulphur and, possibly, ammonium sulphamate, guanidine sulphamate and guanidine sulphate. This mixture can be leached with cold water which will dissolve all the components except the melamine and sulphur. The melamine and sulphur residue can be separated from the cold water leach solution by filtration and the melamine can be separated from the sulphur by leaching the residue with hot water which dissolves the melamine which can then be separated from the sulphur by filtration. The melamine can be recovered from the melamine solution by cooling the solution to crystallize melamine and filtering to separate the melamine from the solution. The filtrate can be returned to the melamine leaching step.

The method of the present invention possesses a number of important advantages. The reaction between the urea, sulphur dioxide and ammonia can be conducted under conditions which produce a product containing a high yield of melamine. The reaction can be controlled easily within narrow pressure, temperature and time of retention limits, and the reaction product can be recovered without difficulty from the reaction vessel. The reaction product treatment stages are easily conducted in inexpensive and readily available equipment and the melamine can be recovered easily in a highly purified state from the reaction product. As the reactions involved in this method generate heat, at least in the initial stages, and the temperature can be controlled readily by evaporation of excess ammonia, no heat need be added to the reaction vessel under normal operating conditions and no auxiliary heating or cooling equipment is required.

What we desire to protect by Letters Patent of the United States is:

1. A method of making melamine that comprises heating together urea, sulfur dioxide and ammonia at a temperature of about 300° C. for a period of about two hours in a closed vessel under superatmospheric pressure.

2. The method of producing melamine which comprises reacting urea, sulphur dioxide and ammonia in a closed reaction vessel under a superatmospheric pressure of ammonia above about 200 pounds per square inch at a temperature within the range of from about 300° C. to about 360° C. for a time period of at least about 30 minutes at the lower temperature and at least about 5 minutes at the upper temperature.

3. The method of producing melamine which comprises reacting urea and sulphur dioxide in the mol ratio of sulphur dioxide to urea of from about 1:1 to about 4:1 in the presence of ammonia in excess of the amount required for the reaction with urea and sulphur dioxide to form melamine, the reaction being conducted in a closed reaction vessel under a superatmospheric pressure of ammonia above about 200 pounds per square inch at a temperature within the range of from about 300° C. to about 360° C. for a time period of at least about 30 minutes at the lower temperature and at least about 5 minutes at the upper temperature.

4. The method of producing melamine which comprises reacting urea and sulphur dioxide in the presence of ammonia in excess of the amount required for the reaction with urea and sulphur dioxide to form melamine, the reaction being conducted in a closed reaction vessel under a superatmospheric pressure of ammonia above about 200 pounds per square inch at a temperature within the range of from about 300° C. to about 360° C. for a time ranging from 5 minutes to 11 hours at the upper temperature limit to from 30 minutes to 11 hours at the lower temperature limit.

5. The method of producing melamine which comprises reacting urea and sulphur dioxide in the mol ratio of sulphur dioxide to urea of from about 1:1 to about 4:1 in the presence of ammonia in excess of the amount required for the reaction with urea and sulphur dioxide to form melamine, the reaction being conducted in a closed reaction vessel under a superatmospheric pressure of ammonia above about 200 pounds per square inch at a temperature within the range of from about 300° C. to about 360° C. for a time ranging from 5 minutes to 11 hours at the upper temperature limit to from 30 minutes to 11 hours at the lower temperature limit.

6. The method of producing melamine which comprises reacting urea, sulphur dioxide and ammonia in a closed reaction vessel under a superatmospheric pressure of ammonia above about 200 pounds per square inch at a temperature of about 360° C. for a time period within the range of from about 5 minutes to about 11 hours.

7. The method of producing melamine which comprises reacting urea, sulphur dioxide and ammonia in a closed reaction vessel under a superatmospheric pressure of ammonia above about 200 pounds per square inch at a temperature within the range of from about 300° C. to about 360° C. for a time period of at least about two hours.

8. The method of producing melamine which comprises reacting urea and sulphur dioxide in the mol ratio of sulphur dioxide to urea of from about 1:1 to about 4:1 in the presence of ammonia in excess of the amount required for the reaction with urea and sulphur dioxide to form melamine, the reaction being conducted in a closed reaction vessel under a superatmospheric pressure of ammonia above about 200 pounds per square inch at a temperature within the range of from about 300° C. to about 360° C. for a time period of at least about two hours.

9. The method of producing melamine which comprises reacting urea and sulphur dioxide in the presence of ammonia in excess of the amount required for the reaction with urea and sulphur dioxide to form melamine, the reaction being conducted in a closed reaction vessel under a superatmospheric pressure of ammonia above about 200 pounds per square inch at a temperature within the range of from about 300° C. to about 360° C. for a time period within the range of from about two hours to about eleven hours.

10. The method of producing melamine which comprises reacting urea and sulphur dioxide in the mol ratio of sulphur dioxide to urea of from about 1:1 to about 4:1 in the presence of ammonia in excess of the amount required for the reaction with urea and sulphur dioxide to form melamine, the reaction being conducted in a closed reaction vessel under a superatmospheric pressure of ammonia of at least about 200 pounds per square inch at a temperature of about 360° C. for a time period of at least about thirty minutes.

11. The method of producing melamine which comprises reacting urea, sulphur dioxide and ammonia in a closed reaction vessel under a superatmospheric pressure of ammonia above about 200 pounds per square inch at a temperature of about 300° C. for a time period within the range of from about two hours to about eleven hours.

No references cited.